United States Patent [19]

Paik et al.

[11] Patent Number: 5,687,257
[45] Date of Patent: Nov. 11, 1997

[54] ADAPTIVE CODING LEVEL CONTROL FOR VIDEO COMPRESSION SYSTEMS

[75] Inventors: Woo H. Paik, Encinitas; Edward A. Krause, San Diego; Vincent Liu, San Gabriel, all of Calif.

[73] Assignee: General Instrument Corporation, Hatboro, Pa.

[21] Appl. No.: 336,801

[22] Filed: Nov. 9, 1994

Related U.S. Application Data

[60] Continuation of Ser. No. 153,205, Nov. 16, 1993, abandoned, which is a division of Ser. No. 900,904, Jun. 18, 1992, Pat. No. 5,291,281.

[51] Int. Cl.⁶ .................................................. G06K 9/36
[52] U.S. Cl. ........................... 382/239; 348/405; 382/251
[58] Field of Search ........................... 382/56, 41, 232, 382/239, 251; 348/404, 407, 415, 425, 405, 401, 402; 358/261.2, 430

[56] References Cited

U.S. PATENT DOCUMENTS

| | | | |
|---|---|---|---|
| 5,006,929 | 4/1991 | Barbero et al. | 358/105 |
| 5,046,071 | 9/1991 | Tanoi | 348/402 |
| 5,115,309 | 5/1992 | Hang | 372/96 |
| 5,231,484 | 7/1993 | Gonzalez | 348/407 |
| 5,251,028 | 10/1993 | Iu | 348/401 |
| 5,278,915 | 1/1994 | Chupeau et al. | 382/56 |
| 5,392,362 | 2/1995 | Kimura et al. | 386/56 |

FOREIGN PATENT DOCUMENTS

| | | |
|---|---|---|
| 0470773 | 2/1992 | European Pat. Off. . |
| A-0470773 | 2/1992 | European Pat. Off. . |
| 0474444 | 3/1992 | European Pat. Off. . |
| 0475251 | 3/1992 | European Pat. Off. . |
| A-0474444 | 3/1992 | European Pat. Off. . |
| A-0475251 | 3/1992 | European Pat. Off. . |
| 0481768 | 4/1992 | European Pat. Off. . |
| A-0481768 | 4/1992 | European Pat. Off. . |
| 0498578 | 8/1992 | European Pat. Off. . |
| A-0498578 | 8/1992 | European Pat. Off. . |

OTHER PUBLICATIONS

A. Razavi, et al., "VLSI Implementation of an Image Compression Algorithm with a New Bit Rate Control Capability," *IEEE International Conference on Acoustics, Speech and Signal Processing*, vol. 5, D₂EV, Mar. 23, 1992, pp. 669-672.

Razavi et al. "VLSI Implementation of an Image Compression Algorithm with a New Bit Rate Control Capability", *IEEE International Conferences on Acoustics, Speech and Signal Processing*, vol. 5, D₂EV, Mar. 23, 1992, pp. 662-672.

*Primary Examiner*—Joseph Mancuso
*Attorney, Agent, or Firm*—Barry R. Lipsitz; Ralph F. Hoppin

[57] ABSTRACT

An apparatus and method for adaptively compressing blocks of video image data provide a local coding level for use in compressing successive blocks of video image data. Each block is preliminarily compressed using a global coding level. The preliminarily compressed data is processed to provide a measure of the randomness of an image area represented by the block of video image data. A local coding level is generated based on the randomness measure. The video image data is then compressed using the local coding level to provide compressed data for transmission. One or more intermediate compression stages can be provided, each generating an intermediate coding level, to better refine the randomness measure for use in generating the local coding level.

1 Claim, 2 Drawing Sheets

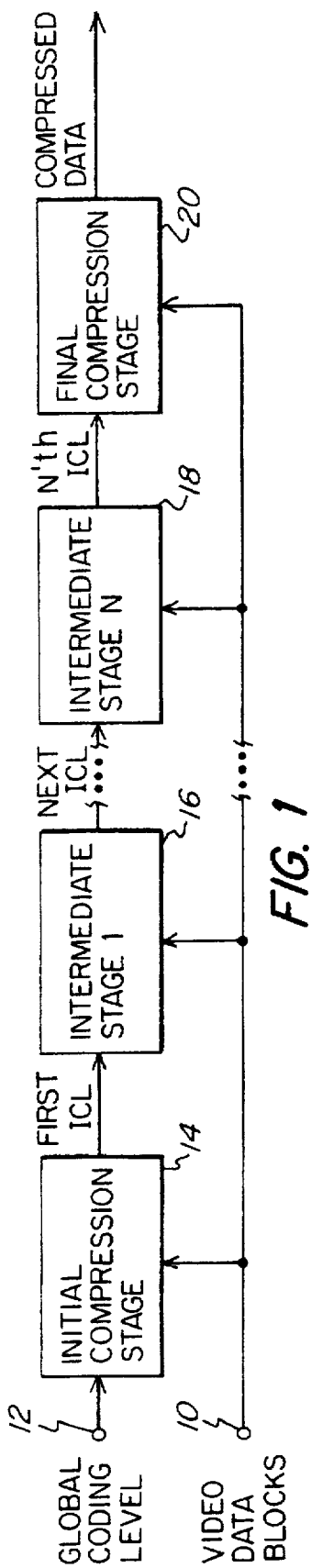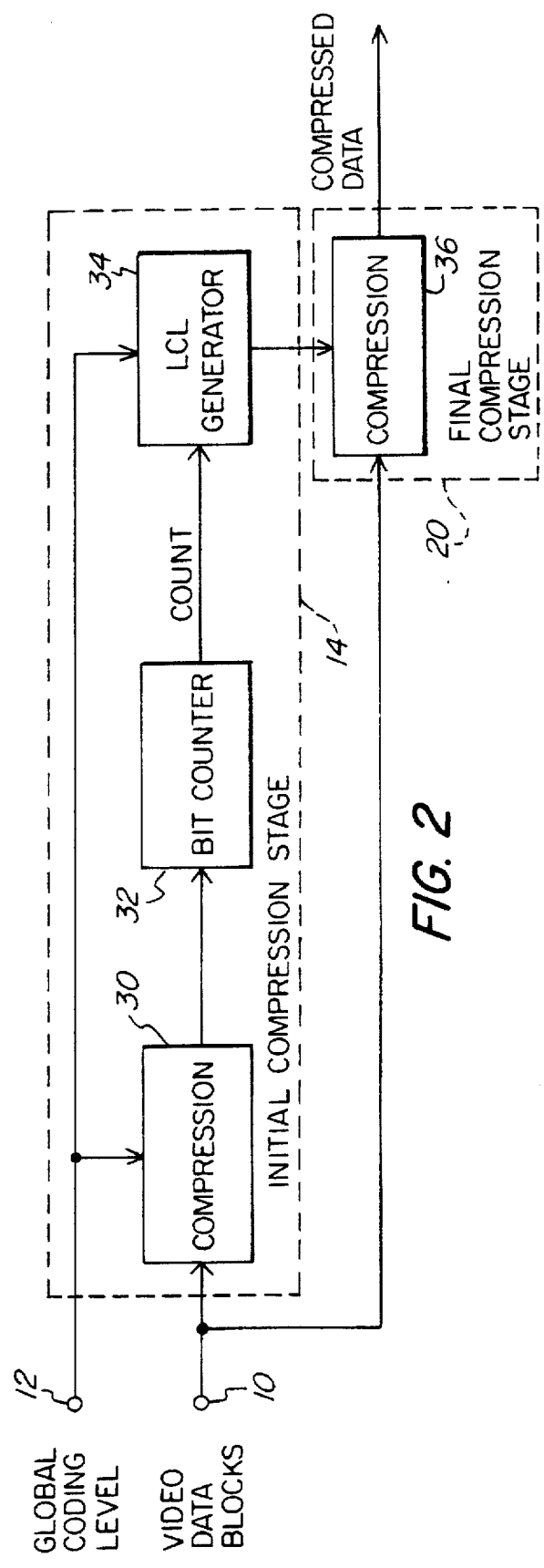

ADAPTIVE CODING LEVEL CONTROL FOR VIDEO COMPRESSION SYSTEMS

This application is a continuation of commonly assigned, U.S. patent appliction Ser. No. 08/153,205 filed Nov. 16, 1993, now abandoned which is a divisional of prior application Ser. No. 07/900,904 filed on Jun. 18, 1992, now U.S. Pat. No. 5,291,281.

BACKGROUND OF THE INVENTION

The present invention relates to the compression of digital video data, and more particularly to a method and apparatus for adaptively compressing blocks of video image data according to a local coding level. The method and apparatus of the present invention are applicable to any video compression system where the quality level of reconstructed video is periodically adjusted in order to maintain a constant compression ratio, Data compression is required when a video signal exceeds the data capacity of a communication channel or when it is desired to increase the number of services available on a channel. In such cases, the combined data rate of all services on a channel must be matched to the throughput limit of the channel. This can be done by establishing a coding level that is observed and used by each video encoder to adjust the quality level of the reconstructed video. Since the data rate increases as the image quality is raised and decreases as the signal quality is reduced, it is possible to match the data rate with the capacity of the channel by periodically adjusting the coding level as a function of the data rate that is observed. Short term fluctuations in the instantaneous data rate can be evened out by buffering the compressed signals before and after transmission. In a system where multiple video services use the same channel, the coding level can be shared by observing the combined data rate of all services. Alternatively, each service can maintain an independent coding level by observing its own data rate only.

Various different digital compression systems are known in the art for reducing the amount of data needed to adequately represent a sequence of video images. An example of such a system is provided in Paik, "DigiCipher - All Digital, Channel Compatible, HDTV Broadcast System," *IEEE Transactions on Broadcasting*, Vol. 36, No. 4, December 1990, incorporated herein by reference. In the system described in the aforementioned article, a highly efficient compression algorithm based on discrete cosine transform (DCT) coding is used. Motion compensation is also provided to further enhance the image compression.

The use of such systems makes it possible to achieve compression ratios in excess of 100:1. Most of the video compression algorithms used in these systems take advantage of statistical properties of the image. Occasionally, certain sequences of images will be encountered where these statistical properties do not apply. In such cases, a constant compression ratio cannot be maintained without visibly impairing the resulting image. In general, the variation in picture quality increases as compression systems become more powerful and more sophisticated. Usually, it is only the average compression ratio that is improved by such systems.

For a wide range of compression algorithms, the most effective way to control the video quality as a function of the coding level is to vary the precision of the quantizers that are applied to the video data. For example, if the coding level specifies that the data rate is to be reduced, then the coarseness of the quantizers may be increased. Similarly, if the data rate is to be increased, then finer quantizers may be used. Other methods of varying the picture quality in response to the established coding level include changing one or more of the video frame rate, spatial sampling rate, and image block size. In the case where differential coding is used (e.g., in connection with motion compensation), the refresh rate may also be varied.

Such systems are effective in matching the data rate of the compressed video to the data rate of the communications channel. These systems do not evenly distribute the available data capacity throughout the image. Typically, the more complex or detailed regions will consume the most bits and the less complex regions will consume the least. Such compensation is generally easy to implement in a transform coding system. In particular, most frequently used video transforms produce transform coefficients with amplitudes that are representative of the energy in a particular band of the frequency spectrum. Therefore, errors can be introduced into selected frequency bands by coarsely quantizing the corresponding transform coefficients. In general, the high frequency coefficients are always quantized more coarsely than the low frequency coefficients. This technique is used in the system described in the aforementioned article to Paik.

Ideally, the quantizer precision used for each different frequency band represented by a block of transform coefficients representing a region of an image would be optimized. In the case where all of the artifacts resulting in an image area are attributable to coarse quantization of transform coefficients, such optimization can be done by experimentally or theoretically determining the ideal allocation of weighting factors for each transform coefficient. As the coding level is varied, the weighting factors can increase or decrease proportionately. Alternatively, more sophisticated schemes can be used in order to better maintain an optimum distribution of errors as the coding level is varied. The intent is to set the coding level in order to achieve the desired compression rate, while at the same time, maintaining an ideal distribution of errors.

Although the described method of distributing errors throughout the different frequency bands of an image has been found to be generally satisfactory, the present invention overcomes a significant problem with the prior art schemes. In particular, it is sometimes impossible to detect the occurrence of errors when an image area is sufficiently random. The reason is that there is so little structure in such areas that a viewer is not certain how the feature is supposed to appear. Random noise is an extreme example. Features with little structure consume a very high percentage of the available signal, transmission bandwidth, leaving little bandwidth for other image areas that have more typical video characteristics. The subjective appearance of these other image areas will often be unacceptable, if the coding level is set to maintain the targeted data rate. This occurs because the high data rate required to transmit data for the random areas requires the use of a much lower data rate for the more typical video areas, if the targeted rate is to be achieved.

It would be advantageous to provide a system for adaptively compressing blocks of video image data wherein the coding level is not adversely affected by the occurrence of unstructured regions within an image area. It would be further advantageous to provide such a system that can be efficiently and economically implemented in a digital video compression system. Such a system should maintain a targeted data rate for the compressed video data, without unacceptably reducing the data rate for any portion of an image area.

The present invention provides a system for adaptively compressing blocks of video image data which enjoys the aforementioned advantages.

SUMMARY OF THE INVENTION

In accordance with the present invention, bandwidth from random, unstructured portions of an image area is reallocated to those areas which are structured and well ordered.

Apparatus in accordance with the invention adaptively compresses blocks of video image data according to a local coding level. An initial compression stage includes means for compressing data in a data block based on a global coding level. The number of bits produced by the compressing means for the data block is determined. A count is then provided which is based on said number of bits. A final compression stage includes means responsive to a count from a preceding compression stage for generating a local coding level. The data in the data block is then compressed based on the local coding level.

The initial compression stage provides a test to determine whether the global coding level is an appropriate coding level to use for compressing the data in the data block. In the event that the number of bits produced by using the global coding level in the initial compression stage exceeds a threshold, the final compression stage will generate a different local coding level for use in compressing the data for transmission. It is, of course, quite possible that the local coding level will be the same as the global coding level. This result will occur when the compression achieved by the initial compression stage is acceptable for transmission.

In an illustrated two-stage embodiment, the final compression stage is responsive to the count from the initial compression stage. The local coding level generating means comprise a read only memory coupled to receive the count as a first address input and coupled to receive the global coding level as a second address input. The read only memory outputs the local coding level in response to the first and second address inputs. In the illustrated embodiment, the count comprises the difference between the number of bits produced by the compressing means of the initial compression stage and a reference count.

In another embodiment, at least one intermediate compression stage is coupled between the initial and final compression stages. The intermediate compression stage includes means responsive to an internally generated count and an intermediate coding level (ICL) from a preceding stage. Intermediate compressing means compress the data in the data block based on the intermediate coding level. The number of bits produced by the intermediate compressing means for the data block is determined. An intermediate coding level is then provided based on the number of bits produced by the intermediate compressing means (i.e., the internally generated count). The final compression stage generates the compressed video output using the last intermediate coding level as the local coding level.

In the embodiment that includes at least one intermediate compression stage, the coding level generating means for each intermediate compression stage can comprise a look-up table (e.g., read only memory) that uses a count from the current stage as a first address input. The previous intermediate coding level is provided as a second address input. In this manner, the look-up table for each intermediate compression stage outputs the associated intermediate coding level in response to the first and second address inputs thereto. The look-up table for the nth intermediate compression stage outputs the local coding level in response to the first and second address inputs thereto. In a preferred embodiment, the count provided by each compression stage that precedes the final compression stage comprises the difference between the number of bits determined by that compression stage and a reference count.

A method in accordance with the present invention adaptively compresses blocks of video image data according to a local coding level. Video image data is preliminarily compressed. The preliminarily compressed video image data is then processed to provide a measure of the randomness of an image area represented by the video image data. A local coding level based on said measure is generated, and the video image data is then compressed based on the local coding level. In an illustrated embodiment, the preliminary compressing step compresses a block of video image data based on a global coding level.

The preliminary compressing and processing steps can comprise the steps of first compressing a block of video image data based on a global coding level to provide first compressed data. The first compressed data is processed to provide a first measure of the randomness of the image area. An intermediate coding level is generated based on said first measure. The block of video image data is next compressed based on the intermediate coding level to provide second compressed data. The second compressed data is processed to provide a second measure of the randomness of the image area. The local coding level is then generated based on the second measure. Additional compressing and processing steps can be used between the first and next compressing steps to provide at least one additional measure of the randomness of the image area.

In a preferred embodiment, the processing of the preliminarily compressed video image data to provide said measure of randomness can determine the amount of data that is generated by the preliminary compressing step. The more random the image area, the more data will be generated by the preliminary compressing step.

A method is also provided for adaptively adjusting a signal coding level throughout an image area represented by an encoded video signal. The randomness of a plurality of different regions that reside in the image area is determined. A lower quality coding level is provided for use in coding regions that are more random to enable the use of a higher quality coding level in regions that are less random. The randomness of the different regions can be determined by compressing data from said regions. The amount of compressed data generated for each region is then determined to provide a measure of the randomness of that region.

BRIEF DESCRIPTION OF THE DRAWINGS

FIG. 1 is a block diagram of apparatus in accordance with the present invention that includes an initial compression stage, a plurality of intermediate compression stages, and a final compression stage;

FIG. 2 is a block diagram of a two-stage compression apparatus, illustrating the initial compression stage and the final compression stage in greater detail;

DETAILED DESCRIPTION OF THE INVENTION

Figure 3:
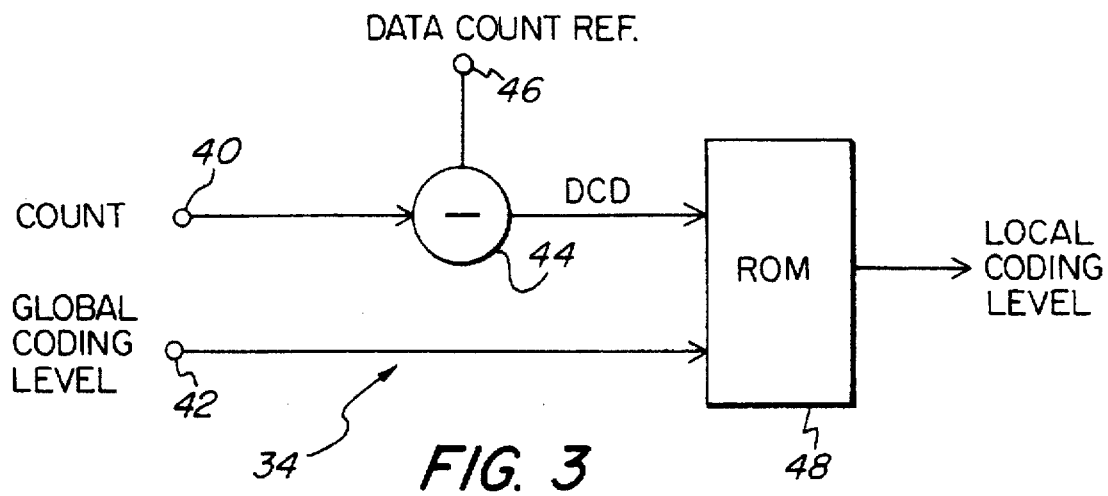
FIG. 3 is a more detailed block diagram of the local coding level generator illustrated in the final compression stage of FIG. 2.

In order to provide compressed video data in accordance with the present invention, an image frame is first divided into regions or blocks. Techniques for providing such regions or blocks are well known, as indicated, for example, in the aforementioned article to Paik.

In the case of transform coding (using, e.g., the discrete cosine transform), the block size should be at least as large as the block size of the transform. In the case of overlapping block transforms (e.g., the lapped orthogonal transform known as LOT), the block size should be at least the size of the block of coefficients generated by a single application of the transform. The only reason for not selecting the minimum block size is to reduce the overhead associated with the transmission of the local coding level to the decoder(s).

One method of measuring the "randomness" of a video image region is to compress the data representing the region and then observe the amount of data that results from the compression. Most efficient compression devices, such as the transform coder, are capable of significantly reducing the amount of information needed to represent most structured or easily discernable patterns. However, features that are random and contain very little structure cannot be effectively compressed.

In the present invention, the relative degree of randomness is of interest. An established coding level, referred to as a global coding level (GCL) can be used to assure that the average data rate remains constant. If a single block of the image is compressed using the global coding level, the relative degree of randomness can be inferred by observing the amount of data after compression and comparing this number to the average amount of data that corresponds to a targeted data rate. The unique use of a randomness criterion in accordance with the present invention provides for a straightforward implementation, due to the ability to infer randomness as noted above. This is a significant advantage provided by the invention. In addition, since the target bit rate remains constant, the reference data count used in inferring randomness will not change. Therefore, there is no need to compute a dynamic reference from the video data itself.

Once the degree of randomness is determined, the apparatus and method of the present invention specify a new local coding level, which can be the same as or different from the global coding level. The block of transform coefficients, which represent a portion of image data, is compressed once again. The amount of data generated the second time can again be observed and a second adjustment may be made. However, in a preferred embodiment, only one adjustment is made and the data resulting from the second compression is transmitted over a communications channel.

A block diagram of apparatus in accordance with the present invention is provided in FIG. 1. Blocks of video data represented by transform coefficients are input via terminal 10 to an initial compression stage 14. The data blocks are compressed according to a global coding level input to the initial compression stage 14 via terminal 12. The initial compression stage determines a count for the resultant compressed data. For example, the number of bits in the compressed data can be counted using conventional counter circuitry. In a preferred embodiment, the number of bits resulting from the compression of the data block is compared to a reference count (i.e., a count threshold) and the difference is used to determine a first intermediate coding level which is passed on to an intermediate stage 16. Intermediate stage 16 is optional. As indicated in FIG. 1, any number of intermediate stages can be provided, each providing a new coding level based on the compression of the original data block using a different coding level.

Where an intermediate stage 16 is provided as shown in FIG. 1, the number of bits in the compressed data that results from the use of the first intermediate coding level is determined, and used to generate a second intermediate coding level that is output from intermediate stage 16 to a subsequent intermediate stage 18. Intermediate stage 18, in turn, uses the second intermediate coding level to generate another intermediate coding level that is used to again compress the original data block. A coding level from the last intermediate stage is input to a final compression stage 20. This stage generates the compressed video data based on the nth intermediate coding level. The local coding level is defined to be the same as the nth intermediate coding level.

It should be appreciated that any number of intermediate stages can be provided. Alternatively, a two-stage system can be provided that only uses an initial compression stage and a final compression stage, without any intermediate stages. Such an embodiment is illustrated in FIG. 2.

As shown in FIG. 2, initial compression stage 14 includes a compression section 30, a bit counter 32, and a local coding level (LCL) generator 34. The compression section can comprise, for example, a conventional quantizer that quantizes the blocks of transform coefficients received via terminal 10. The quantizer is responsive to the global coding level input via terminal 12 to adjust the coarseness/fineness of the quantization. The number of bits contained in the compressed data output from compression section 30 is determined by bit counter 32. This count is output from the initial compression stage and input to the local coding level generator 34. The local coding level generator also receives the global coding level via terminal 12, and provides the final local coding level for use by the final compression stage 20 that comprises compression section 36. The blocks of video transform coefficients received via terminal 10 are compressed in compression section 36 based on the local coding level received from local coding level generator 34. The compressed data is output for transmission via a conventional communications channel.

An implementation of the local coding level generator 34 is illustrated in FIG. 3. The data count provided by bit counter 32 is input to a subtractor 44 via terminal 40. This count is subtracted from a data count reference that is input to the subtractor via terminal 46. As noted above, the data count reference is a constant that is computed from the data rate of the communications channel and the size of the data block before compression. In the illustrated embodiment, it is assumed that only one video service is transmitted over the channel. In the case of multiple services, the data count reference would represent a fraction of the total bandwidth allocated to the particular service. If the same coding level were shared by all services, then each would use the same reference and the sum of all references would equal the capacity of the channel. An example of a system that provides a plurality of services on a single channel can be found in commonly assigned, copending U.S. patent application Ser. No. 07/809,561, filed Dec. 24, 1991 for "Statistical Multiplexer for a Multichannel Image Compression System."

Subtractor 44 outputs a data count difference (DCD) that is applied to a first address input of a read only memory (ROM) 48. The global coding level is applied to ROM 48 as a second address input via terminal 42. ROM 48 contains a look-up table that outputs a predetermined local coding level based on the specific address inputs received. As indicated in the description of FIG. 2, the local coding level output from ROM 48 is used by the compression section 36 to provide compressed data using the quantization specified by the local coding level.

Figure 4:
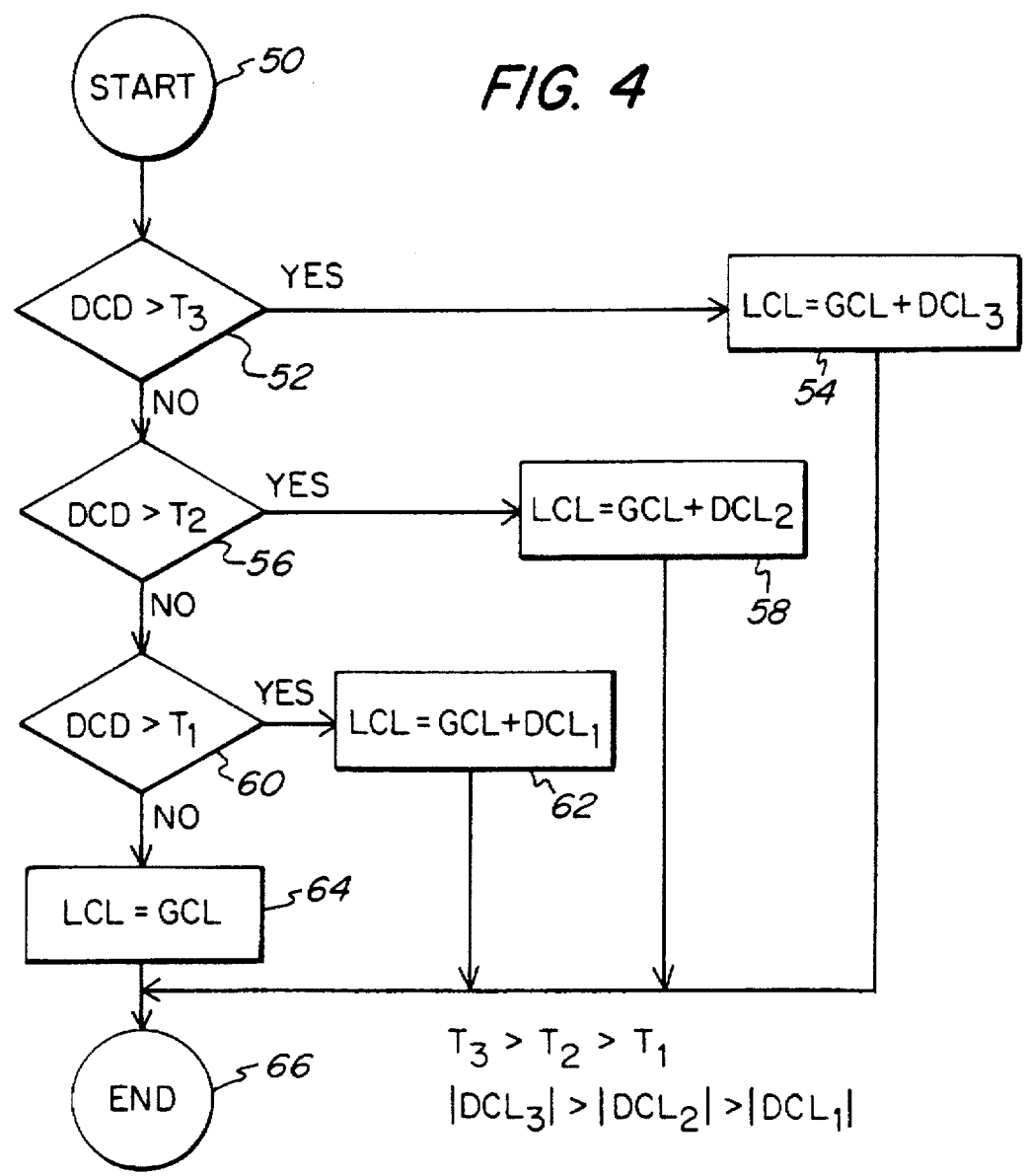
FIG. 4 is a flowchart illustrating a routine for generating the local coding level.

A routine for calculating the local coding levels that are stored in ROM 48 is illustrated in flowchart form in FIG. 4.

The routine commences at box 50, and at box 52 a determination is made as to whether the data count difference output from subtractor 44 (FIG. 3) is greater than a threshold value $T_3$. $T_3$ is the highest threshold value provided. If the DCD is greater than $T_3$, the local coding level is determined at box 54 by adjusting the global coding level (GCL) by an adjustment factor $DCL_3$.

If the data count reference does not exceed threshold $T_3$, a determination is made at box 56 as to whether it exceeds a threshold $T_2$. If so, the local coding level is obtained by adjusting the global coding level by a factor $DCL_2$, as indicated at box 58.

If the data count reference does not exceed threshold $T_2$, a determination is made at box 60 as to whether it exceeds a threshold $T_1$. If so, the local coding level is obtained by adjusting the global coding level by an adjustment factor $DCL_1$, as indicated at box 62. If the data count reference does not exceed any of the thresholds, where $T_3>T_2>T_1$, then the global coding level is used for the local coding level, as indicated at box 64. The routine then ends at box 66. As indicated in the figure, $|DCL_3|>|DCL_2|>|DCL_1|$. The thresholds and the adjustment factors $DCL_1$ can be customized for different compression systems.

It should now be appreciated that the present invention provides a method and apparatus for adaptively adjusting a signal coding level throughout an image area represented by an encoded video signal. The adjustment is based on the degree of randomness determined for different regions of an image area. A lower quality coding level is provided for use in compressing regions that are more random. This enables the use of a higher quality coding level to compress regions that are less random. Randomness of a given region can be determined by compressing the data from that region, and determining the amount of compressed data generated for the region. A local coding level decision is provided for the actual compression used in the transmission of each region. An advantage of the local coding level decision provided in accordance with the present invention is that it helps to even out the channel data rate. Stability of the global coding level decision structure is also provided.

Although the invention has been described in connection with various specific embodiments thereof, it will be appreciated by those skilled in the art that numerous adaptations and modifications may be made thereto, without departing from the spirit and scope of the invention as set forth in the claims.

What is claimed is:

1. A method for adaptively adjusting a signal coding level used in the compression of a video signal that is representative of an image area, said signal coding level dictating an amount that said video signal will be compressed for transmission over a communication channel having a predetermined bandwidth, comprising the steps of:

(a) in a first compressing step, compressing data from said video signal representative of a plurality of different image regions that reside in said image area, said first compressing step using the same signal coding level for all of said different image regions to generate an amount of compressed data for each of said image regions;

(b) monitoring the amount of said compressed data generated for each of said image regions during said first compressing step;

(c) adjusting said signal coding level to establish different video quality levels for said different image regions in response to the amount of compressed data generated for each of said image regions as determined by said monitoring step; and (d) in a second compressing step which follows said first compressing step, compressing said data from said plurality of different image regions using said adjusted signal coding levels to provide data which is adapted for transmission over said communication channel;

said second compressing step selectively providing more compression to image regions that generated the most compressed data and less compression to image regions that generated the least compressed data during said first compressing step, while maintaining said data which is adapted for transmission over said communication channel within said predetermined bandwidth.

* * * * *